(12) United States Patent
Lin et al.

(10) Patent No.: US 9,053,125 B2
(45) Date of Patent: Jun. 9, 2015

(54) SYSTEM UTILIZING LIGHT SIGNALS WITH WAVELENGTHS APPROXIMATELY BEYOND HUMAN SENSITIVE LIGHT SPECTRUM

(71) Applicants: Lang Lin, Potomac, MD (US); Wang Su, East Patchogue, NY (US)

(72) Inventors: Lang Lin, Potomac, MD (US); Wang Su, East Patchogue, NY (US)

( * ) Notice: Subject to any disclaimer, the term of this patent is extended or adjusted under 35 U.S.C. 154(b) by 0 days.

(21) Appl. No.: 13/940,257

(22) Filed: Jul. 12, 2013

(65) Prior Publication Data
US 2015/0014407 A1    Jan. 15, 2015

(51) Int. Cl.
*G06F 17/00*      (2006.01)
*G06F 17/30*      (2006.01)

(52) U.S. Cl.
CPC .... *G06F 17/30247* (2013.01); *G06F 17/30725* (2013.01)

(58) Field of Classification Search
USPC .......... 235/375, 462.44, 462.43, 472.01, 235/472.02, 472.03
IPC ..... G06Q 30/02; G07F 7/1008; G06K 7/10891, G06K 7/10881, 7/10851, 7/10772, 17/0022
See application file for complete search history.

(56) References Cited

U.S. PATENT DOCUMENTS

| | | | |
|---|---|---|---|
| 7,147,160 B2 | 12/2006 | Rathus et al. | |
| 7,600,691 B2 | 10/2009 | Rathus et al. | |
| 8,261,994 B2 | 9/2012 | Rathus et al. | |
| 2003/0205621 A1* | 11/2003 | Soni et al. | 235/468 |
| 2009/0272811 A1* | 11/2009 | An | 235/462.44 |
| 2013/0063561 A1 | 3/2013 | Stephan | |

* cited by examiner

*Primary Examiner* — Karl D Frech

(57) ABSTRACT

Identification systems and methods for utilizing light signals with wavelengths approximately above or below human sensitive light spectrum are disclosed comprising a special mark, wherein the special mark emits or absorbs light signals in light spectrums approximately below or above the visible light spectrum, a server comprising a processing unit, and a storage area, wherein the special mark is capable of being detected by the photographic instrument, and wherein a digital file is saved in the storage area, and wherein the special mark carries information which identifies the digital file saved in the storage area.

12 Claims, 3 Drawing Sheets

SYSTEM UTILIZING LIGHT SIGNALS WITH WAVELENGTHS APPROXIMATELY BEYOND HUMAN SENSITIVE LIGHT SPECTRUM

BACKGROUND OF THE INVENTION

Identification systems are commonly used to identify an item, such as a place, or a location. The most commonly used identification system is the naming system. Each place or location may have its own name, such as a store name or a street name. The naming system is very effective at a local level. However, at a larger level, such as at national or global level, it is very often too imprecise to be very useful. For example, many stores across a nation may have the same name. Many streets in different cities may have the same name. When you just have the information of the name, it will be impossible to pinpoint precisely which place, which location you are referring to. The same is also true with respect to products and services and many other kinds of items that need to be identified.

One possible solution is to assign a unique identifier to each item that needs to be identified. There can be a database that stores all the assigned identifiers and their associated items. Once a unique identifier is obtained, the database will be able to retrieve the specific information for the particular item associated with this unique identifier. A unique identifier, for example the unique internet web address associated with a particular product or place, can be printed on a picture showing an item, such as a product or a place. Once someone sees the product or the place, the person can take a picture of the unique identifier, such as the unique internet web address. Once the internet web address is obtained, the user can then use the internet web address to obtain special information stored at such internet web address associated specifically with such product or place. This is a much more precise method to identify a specific item. If someone simply types a name into an internet search engine such as Google, this person will likely receive vast amount of unrelated information. Using the unique identifier system avoids such issue and greatly improves efficiency.

There are certain issues associated with the unique identifier system. The unique identifier, which could be any identifying symbol such as a serial number, a web address, or an encoded symbol, usually is not very visually appealing. In an advertisement environment, visually appealing is very important. For example, a company may be spending millions of dollars to produce very attractive pictures of its products, and display such beautiful pictures at prominent locations to attract attention. Such company may not want to print very large serial numbers or web addresses across such pictures, because if it does so, these pictures may no longer be visually appealing. However, if it does not do so, there may not be a convenient and precise method to convey specific information created for such products directly to the viewers of the pictures.

Therefore, there is a need for a system and method to uniquely identify items including products and places for efficient information retrieval without being visually intrusive.

DETAILED DESCRIPTION OF POSSIBLE EMBODIMENTS OF THE INVENTION

Possible embodiments of the invention are discussed in this section.

Light signals are electromagnetic signals with wavelengths across a wide range of spectrum. Only a small portion of the spectrum is visible to human eye. On average, a human eye can see light signals with wavelengths between approximately 400 nanometer to approximately 700 nanometer. This is an approximate range because different persons may have slightly different variations in terms of the range of spectrum they can see. However, the closer the light signals get to the approximate edges of the visible light spectrum, the weaker they would appear to human eye. Such light signals are ether invisible, or barely visible to the eyes of a person, depending on how far the light signals are off the visible light spectrum, and the sensitivity of the eyes of the viewing person. Light signals with wavelengths immediately below visible light spectrum with shorter wavelengths are called ultraviolet (UV) light. Light signals with wavelengths immediately above visible light spectrum with longer wavelengths are called infrared (IR) light.

Photographic instruments can respond to a much broader light spectrum as compared to human eye. For example, digital cameras and digital camcorders using CCD or CMOS sensors can respond to both infrared light and ultraviolet light, in addition to visible light. There are also materials, when applied to a surface, can either absorb, or emit infrared or ultraviolet light, such as IR LED, IR ink, UV ink. When these materials are used, certain optical effect could be created that are invisible to human eye but are visible to common photographic instruments.

Figure 1:
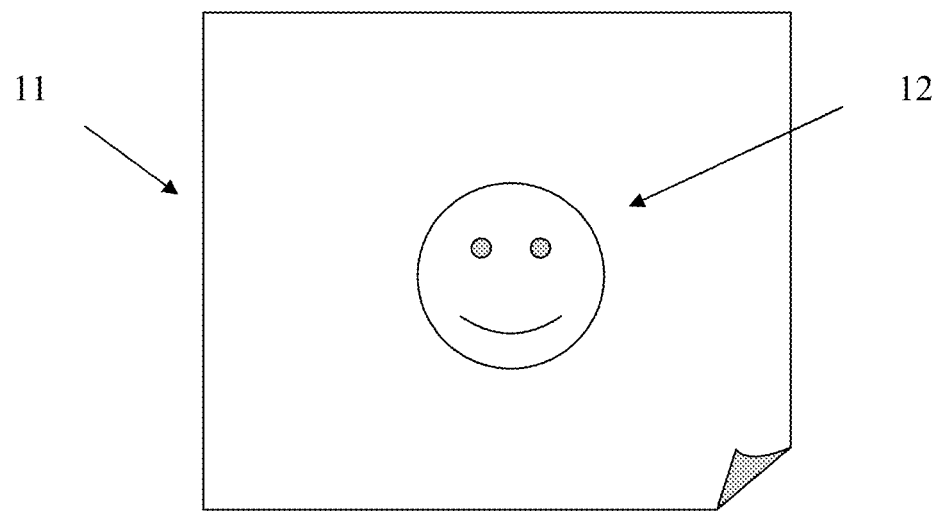
FIG. 1 is an illustrative view of a pair of images seen with human eye.

FIG. 1 is an illustrative view of a pair of images seen with human eye. Two images are shown on a surface 11. One of the two images, a smiling face 12, is shown within visible light spectrum. The second of the two images emits or absorbs light signals in light spectrums approximately below or above the visible light spectrum, so that it is invisible, or barely visible to human eye. The second image could be created by using IR LEDs embedded on surface 11, or by drawing on surface 11 with IR ink or UV ink. Other means could also be used to create the second image, such as using an IR or UV projector.

Figure 2:
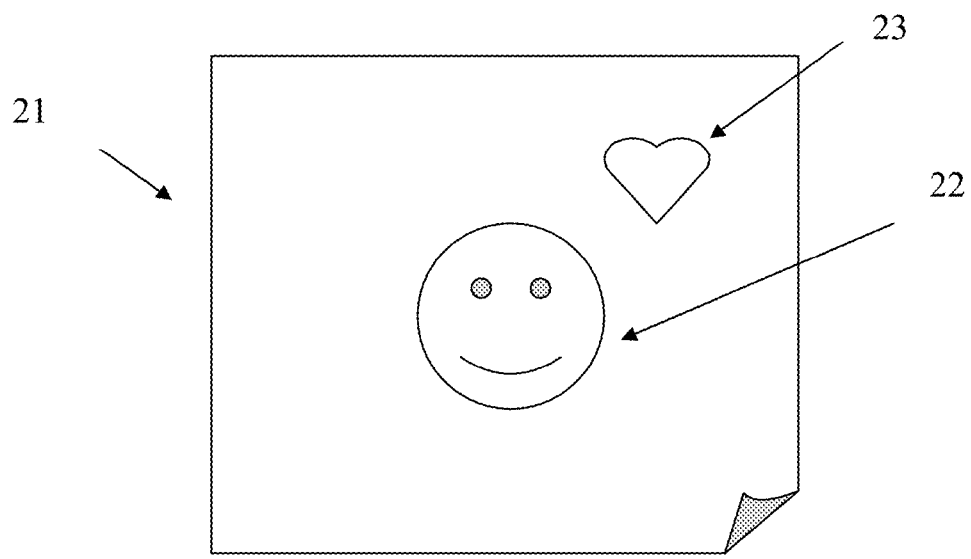
FIG. 2 is an illustrative view of the same pair of images seen with a photographic instrument.

FIG. 2 is an illustrative view of the same pair of images seen with a photographic instrument. As described above, two images are shown on surface 21. One of the two images, a smiling face 22, is shown within the visible light spectrum. The second image 23, a heart shape, emits or absorbs light signals in light spectrum approximately below or above the visible light spectrum. Because common photographic instruments, such as digital cameras and digital camcorder, use sensors that are responsive to infrared light and ultraviolet light in addition to visible light, they can detect light signals in the light spectrums as those lights signals emitted or absorbed by the second image 23. If the second image 23 emits light signals approximately below or above the visible light spectrum, the photographic instrument can detect these digital signals, and produce electronic signals in accordance with the light signals approximately below or above the visible light spectrum. These electronic signals will then enable the photographic instrument to digitally reproduce the corresponding image, such as the heart shape. The reproduced image can be either shown on a display or stored in a memory. When it is shown on a display, it can be shown within the visible light spectrum, so that it can be seen clearly with human eye.

If the second image 23 absorbs lights signals in light spectrums approximately below or above the visible light spectrum, and the surface 21 is illuminated by light signals in the spectrums approximately below or above the visible light spectrum, the photographic instrument can detect the absence of light signals from the second image by detecting the reflected light signals from the part of the surface 21 that is not covered by the second image 23 in the light spectrums approximately below or above the visible light spectrum. Therefore, the second image 23 will be seen by the photographic instrument as a dark image against a brighter background. Through detecting the second image 23 by this method, the photographic instrument can reproduce the second image electronically and show it within the visible light spectrum, so that it becomes clearly visible to human eye.

Figure 3:
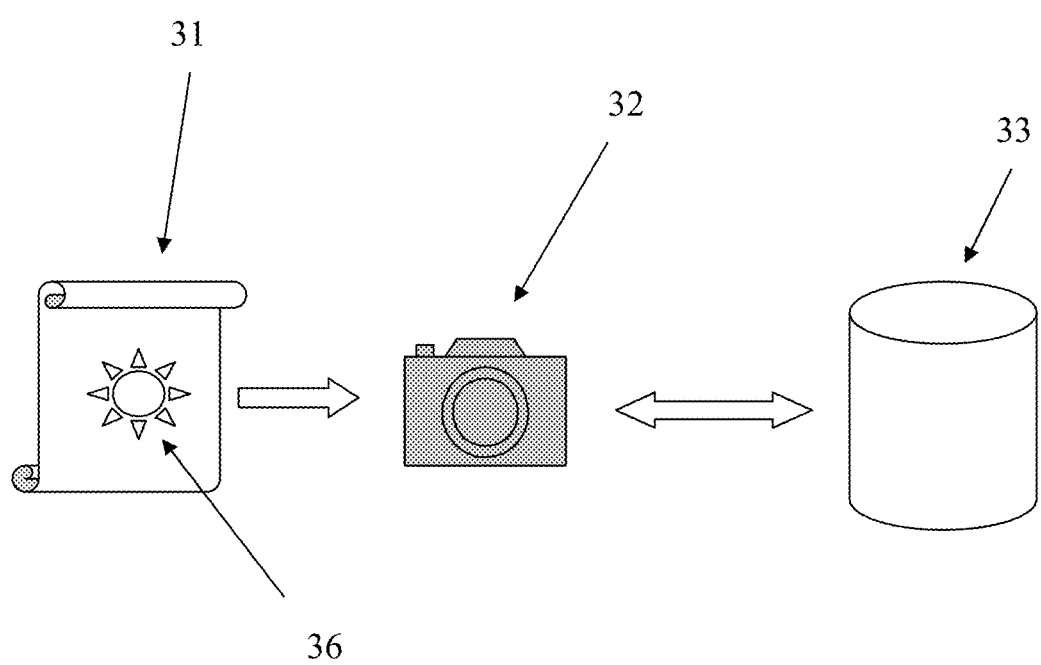
FIG. 3 is an illustrative view of a unique identification system according to one embodiment of the invention.

FIG. 3 is an illustrative view of a unique identification system according to one embodiment of the invention. According to this embodiment, a unique identifier 36 is attached to a surface 31. The surface 31 could be the surface of a poster, the surface of a billboard, the surface of a building, the surface of a product packaging, or an electronic display surface such as a large LED display board. The unique identifier 36 either absorbs or emits light signals in light spectrums approximately below or above the visible light spectrum, so that it is either invisible or barely visible with human eye but is detectable by a photographic instrument 32. The unique identifier 36 can be created by IR ink, UV ink, IR LED, or IR projector. The photographic instrument 32 takes a picture of surface 31 with unique identifier 36. Because photographic instrument 32 can detect light signals in light spectrums approximately below or above the visible light spectrum, it can detect unique identifier 36 either by detecting the light signals emitted by it when it emits lights, or by light signals reflected by its surrounding surface when it absorbs lights and the surface 36 is illuminated by light signals in light spectrums approximately below or above the visible light spectrum. Once the photographic instrument 32 detects the unique identifier 36, a software can be run to analyze the digital image produced by the photographic instrument 32 to extract the unique identifier 36 from the background image.

Once the unique identifier 36 is extracted, a software can be run to analyze the unique identifier 36 to extract the unique information embedded in the unique identifier 36. The unique identifier can carry uniquely identifying information such as a serial number, a specific internet web address, or a specific memory address. The serial number, the web address or the memory address could all point to a specific storage address on server 33. Certain digital file, such as texts, images, or videos, can be stored at the storage address on server 33. This certain digital file could be associated with a product, a place, or a person. Such product, place or person is uniquely connected with surface 31.

For example, if the place is a restaurant, surface 31 could either be the surface of a wall of the restaurant, or the surface of a signage attached to the restaurant. In the case of a product, surface 31 could be the surface of the packaging of the product, or the surface of a billboard showing an advertisement of the product. In the case of a person, surface 31 could be the surface of a poster showing a picture of the person. Since there is established connection between surface 31 and the product, the place, or the person to be identified, same connection between the unique identifier 36 and the same product, place, or person can be established by affixing the unique identifier 36 to the surface 31. The unique identifier carries information that identifies a specific storage address on server 33. A digital file associated with the same product, place, or person can be stored at the storage address on server 33. Thus, a chain of connection is established among the product, place, or person to be identified, the unique identifier 36, and the digital file stored on server 33.

Figure 4:
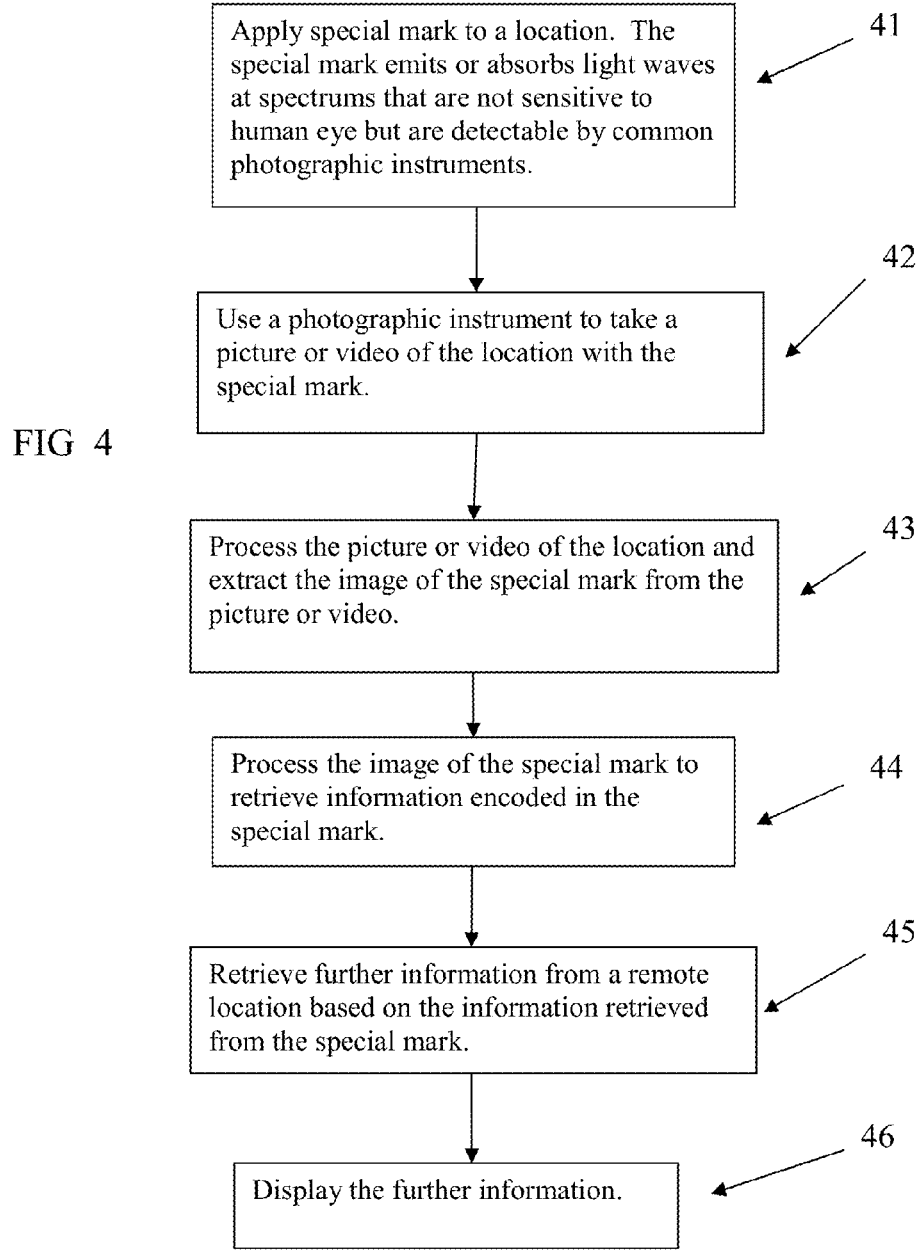
FIG. 4 is a flow chart showing illustrative steps that may be followed to perform information retrieval using the identification system according to one embodiment of the invention.

FIG. 4 is a flow chart showing illustrative steps that may be followed to perform information retrieval using the identification system according to one embodiment of the invention. According to this embodiment of the invention, at step 41, a special mark is applied to a location. The special mark emits or absorbs light signals in light spectrums approximately below or above the visible light spectrum, with wavelengths approximately shorter or longer than the wavelengths of light signals in the visible light spectrum, so that they are either invisible or barely visible to human eye, but are detectable by photographic instruments. The special mark could be created by materials such as IR LED, IR projector, IR ink or UV ink.

One example is that IR LEDs are installed along side with regular LEDs on an LED display. Regular LEDs emit light signals in the visible light spectrum and are clearly visible to human eye. The regular LEDs on the LED display are used to display regular information. The IR LEDs emit lights with wavelengths at approximately the longer end of the visible light spectrum or above it. The IR LEDs are used to display the special mark. Under normal viewing conditions, human eye can see the information displayed by normal LED, but the special mark displayed by the IR LEDs is either invisible or barely visible to human eye, so that it is not distracting to watch. Because the IR LEDs emitting light signals with wavelengths at approximately the upper end or beyond the upper end of the visible light spectrum could still be seen by some people, it is important to increase the dynamic contrast between the information displayed by the normal LEDs and the special mark displayed by the IR LEDs, so that the special mark is visually non-intrusive. The intensity and brightness of the IR LEDs can be adjusted dynamically according to the intensity and brightness of the normal LEDs surrounding them. For example, if the brightness of the normal LEDs placed near an IR LED is very high at a given moment, then the brightness of that IR LED could also be increased and the IR LED still remain much less visible as compared to the normal LEDs near it. If the brightness of the normal LEDs placed near the IR LED becomes low at a different moment, then the brightness of the IR LED is also decreased to ensure that the IR LED remains much less visible as compared to the normal LEDs near it. As another example, the IR LEDs could also be embedded on the surface of a map. The IR LEDs display a special mark that encodes the positional information of the map. If a user standing in front of the map obtains the positional information embedded in the special mark, the user would be able to identify the exact physical location of the map. The map could be an outdoor map. It could also be an indoor map showing the internal layouts of a shopping mall.

According to another embodiment of the present invention, the special mark is created by using an IR ink to paint the special mark on a surface. The surface could be the surface of a building, or the surface of a poster. IR ink can absorb light signals with wavelengths at the upper end of the visible light spectrum and in the IR light spectrum. When the surface is illuminated by an IR light source, the IR ink painting the special mark absorbs the IR light signal, and the rest of the surface uncovered by the IR ink reflects the IR light signal. The IR light source could be a dedicated IR light source, it could also be a natural IR light source such as sunlight.

At step 42, a photographic instrument takes a picture or video of the location with the special mark. The location could be a LED display, an indoor map, the surface of a building, a billboard, or the exterior of a product packaging. The photographic instrument is sensitive to light signals in the light spectrum emitted or absorbed by the special mark. The photographic instrument could be a digital camera, a digital camcorder, a smart phone with a camera, or a wearable device such as Google glass. Some photographic instruments may have optical filters installed to block light signals beyond certain spectrum. These kind of photographic instruments typically still allow certain range of light signals in light spectrums approximately below or above the visible light spectrum to pass through. The picture or video will carry the image of the special mark. If the special mark emits light signal, then the image will be a bright image compared to its background. If the special mark absorbs light signal, then the image will be a dark image compared to its background. A video comprises multiple frames. Each frame of a video is a separate picture similar to a picture captured with a still camera.

At step 43, the picture or video taken by the photographic instrument is analyzed to extract the image of the special mark from the background image of the location. This can be done with common image processing methods. Once the image of the special mark is extracted, at step 44, the image of the special mark is processed to retrieve information embedded in the special mark. For example, the special mark could contain a serial number, an internet website address, an address on a memory storage. At step 45, further information is retrieved from a database based on the information retrieved from the special mark. This further information can be information related to the location the special mark is attached to. For example, if the location is a restaurant, this further information could be an introduction of the restaurant, its manual, the cuisine it is most famous of. If the location is a store, the further information could be about the products carried by the store and what promotions it has going on at a particular time. If the location is the packaging or an advertisement of a product, the further information could be an in depth introduction of the product and its pricing, or products associated with such product. If the location is an indoor map found in a shopping mall, the further information could be the exact location of the indoor map in the shopping mall, its surrounding layouts, such as what are the shops in its proximity, where are the nearby restaurants or restrooms. This further information could be any information desired to be shown when the special mark associated with a location is processed. This further information could be presented in text format, or in audio, video, graphical formats, or any combination of these formats. When the further information associated with a special mark is retrieved from a database, a counter could be presented to count how many times the further information is retrieved or transferred, as well as when the further information is retrieved or transferred. The higher the count number is, the more interest is shown to the location associated with the special mark. Additionally, the counter can also record count numbers within different time intervals to form time varying traffic patterns to indicate public interest of the location on a time basis.

At step 46, once the further information is retrieved based on the information embedded in the special mark, the further information is displayed in the visible light spectrum, so that it is clearly visible to a viewer. It can be shown on displays such as a cell phone screen or a Google glass display, or any other electronic displays such as TV or PC monitors.

Through the various embodiments of the present invention as disclosed above, an unique indentifying system can be achieved that can identify a place, a product, and item or a person both precisely and visually non-intrusively, because the unique identifier or special mark used in the system is either invisible or barely visible to human eye. Further obvious variations and implementations exist, they are all encompassed by the present invention.

According to another embodiment of the present invention, supplemental information is utilized to further enhance the system. For example, some modern photographic instruments, such as a smart phone or the Google glass, also have built in GPS that can provide location information. A location such as a shop or a restaurant, often has a visible signage displaying its name. These kinds of additional information can be used to augment the present unique identification system. When a user takes a picture or video of a location using a photographic instrument that provides GPS location information, and the location has a visible signage showing its name, then the location information is recorded and the name of the place can be extracted from the picture using common image processing software. The location information and the name of the place can then be sent to a database, where information can be retrieved based on the name of the place and its location. This augmenting indentifying method can be used in connection with the unique identifiers and special marks described above to enhance the experience. If for technical reasons the unique identifier or special mark displayed in light spectrums approximately below or above the visible light spectrum cannot be retrieved, then the augmenting information can fill the gap and still enable the user to uniquely identify the location.

The system configured to perform the methods and functions described in this application may also contain a server with one or more storage areas to store information, such as digital file. The server could also contain a processing unit to carry on some of the imaging processing functions described in the application. The system may also contain a wired or wireless network, such as internet, cellular network, or WiFi network. Information could be transmitted over the wired or wireless network. The photographic instrument could also contain radios for sending and receiving wireless signals.

It is obvious that there are numerous different variations and combinations of the above described embodiments of the invention. All these different variations, combinations and their structural or functional equivalences are considered as part of the invention. The terms used in the specification are illustrative and are not meant to restrict the scope of the invention. The described methods have steps that can be performed in different orders and yet achieve similar results. All the variations in the design components or orders of the method steps are considered as part of this invention as long as they achieve substantially the same results.

The invention is further defined and claimed by the following claims.

We claim:

1. A visually non-intrusive identification system comprising:
   a special mark, wherein the special mark comprises at least one infrared LED;
   a server comprising a processing unit; and
   a storage area;
   wherein the special mark is capable of being detected by a photographic instrument, and wherein the server is capable of retrieving from the special mark a location of a digital file saved in the storage area, and wherein the brightness of the at least one infrared LED is capable of being dynamically adjusted according to the brightness of other light sources placed near it.

2. The system of claim 1 wherein the photographic instrument is wearable.

3. The system of claim 1 wherein the processing unit is capable of running a software to retrieve an image of the special mark from a picture taken by the photographic instrument.

4. The system of claim 1 wherein the photographic instrument is capable of providing location information.

5. The system of claim 1 further comprising a wireless network, and a counter, wherein the digital file is transmitted over the wireless network, and the counter counts how many times the digital file is transferred.

6. The system of claim 1 wherein the special mark is applied to a surface of an object, and wherein the digital file is related to the object.

7. A method for uniquely identifying an object in a visually non-intrusive manner comprising the steps of:

applying a special mark to a surface, wherein the special mark comprises at least one infrared LED;

dynamically adjusting the brightness of the at least one infrared LED according to the brightness of other light sources placed near it;

receiving an digital image of the surface with the special mark;

processing the image to retrieve the special mark;

processing the special mark to retrieve an information;

retrieving a digital file based on the information; and displaying the digital file in a light spectrum that is visible to human eye.

8. The method of claim 7 wherein the digital image is created with a photographic instrument.

9. The method of claim 8 wherein the photographic instrument is wearable.

10. The method of claim 8 wherein the photographic instrument is capable of providing location information.

11. The method of claim 10 further comprising the step of using the location information to augment the retrieval of the digital file.

12. The method of claim 10 further comprising the steps of retrieving a name from the digital image; and using the name to augment the retrieval of the digital file.

* * * * *